(12) United States Patent
O'Shea

(10) Patent No.: US 7,303,180 B1
(45) Date of Patent: Dec. 4, 2007

(54) VALVE ACTUATOR WITH SPLIT THRUST BEARING

(75) Inventor: Timothy M. O'Shea, Chicago, IL (US)

(73) Assignee: Val Matic Valve & Mfg. Corp., Elmhurst, IL (US)

( * ) Notice: Subject to any disclaimer, the term of this patent is extended or adjusted under 35 U.S.C. 154(b) by 0 days.

(21) Appl. No.: 11/641,449

(22) Filed: Dec. 18, 2006

(51) Int. Cl.
*F16K 31/44* (2006.01)

(52) U.S. Cl. ............... 251/233; 251/285; 74/89.23; 74/509

(58) Field of Classification Search ......... 251/228, 251/229, 233, 285; 74/509, 510, 89.23
See application file for complete search history.

(56) References Cited

U.S. PATENT DOCUMENTS

| | | | |
|---|---|---|---|
| 2,908,182 A * | 10/1959 | Bacchi ............... | 74/509 |
| 3,147,766 A | 9/1964 | Herring et al. | |
| 3,385,120 A | 5/1968 | Nott | |
| 3,575,378 A * | 4/1971 | Fawkes ............... | 251/229 |
| 3,877,677 A * | 4/1975 | Daghe et al. ......... | 251/228 |
| 4,007,910 A * | 2/1977 | Yasuoka et al. ....... | 251/229 |
| RE29,253 E | 6/1977 | Daghe et al. | |

\* cited by examiner

*Primary Examiner*—John Bastianelli
(74) *Attorney, Agent, or Firm*—Greer Burns & Crain Ltd

(57) ABSTRACT

A valve actuator includes a body having at least a first side and an interior. A rotatable, threaded drive screw extends into the body and projects out of the body first and second sides. The drive screw comprises an insertion portion and a distal end portion. A traveling nut is threadingly captured on the drive screw in the body interior. The traveling nut is held against rotation whereby it travels along the drive screw as the screw rotates. An actuator arm engages the nut and is configured to be urged between valve open and closed positions as the traveling nut travels along the drive screw. A first collar is attached to at least a portion of the drive screw insertion portion and has at least a bearing for rotatably engaging the body. A second collar is attached to at least a portion of the drive screw distal end portion and has at least a bearing for rotatably engaging the body.

20 Claims, 7 Drawing Sheets

VALVE ACTUATOR WITH SPLIT THRUST BEARING

BACKGROUND OF THE INVENTION

The present invention generally relates to actuators for valves, for example external actuators for valves such as butterfly valves.

Actuators for valves, such as butterfly valves, are well known. In some arrangements, a drive screw is rotated to cause a traveling nut to move a crank arm attached to the valve shaft to rotate the valve member into and out of engagement with the valve seat.

In the case of some butterfly valves, the valve member may be rotated approximately 90 degrees between an open position and a closed position. The precise closed position may change over time as the valve seat wears, or as conditions require greater or lesser closing force of the valve member against the valve seat. Typically some type of abutment occurs between the traveling nut and a fixed nut carried on the drive screw, as shown in U.S. Pat. Nos. Re. 29,253 and 3,147,766, or between the crank arm and an adjustable stop, such as a stop screw projecting through a wall of the actuator body, as shown in U.S. Pat. No. 3,385,120.

The drive screw may be supported and held in place through use of a single locking collar secured about the circumference of the drive screw near its penetration into the housing on a screw insertion end. The collar may be held on the drive screw through use of a locking pin so that it rotates with the drive screw. The housing may define a cylindrical holding chamber for rotatably holding the collar, which chamber may also be partially defined by a removable access cover. Removal of the access cover provides for insertion and removal of the drive shaft. Thrust bearings may be on one or both of the axial ends of the collar for rotatable engagement between the collar and surfaces of the holding chamber.

In designs that utilize stop screws projecting through the actuator body, as well as some other designs, known configurations risk disadvantageous deformation of the drive screw as a result of loads placed on it. For example, when the drive screw is rotated to urge the valve member into a fully open or closed position, the traveling nut may be urged against the stop screw. In the case of some valve actuators, with an example being relatively large valve actuators, a considerable closing force may be imparted onto the drive screw. It is not uncommon, for example, for a load of 450 ft-lbs to be applied in some large butterfly valve actuators. This load is, at least to some extent, distributed through the thrust bearings provided in the single locking collar on the screw insertion end. Some valve actuators of the prior art have suffered a shortened service life as a result of these loads. With the traveling nut located along the drive screw some distance from the single locking collar and its thrust bearings, for example, some valve actuator drive screws of the prior art have bowed or otherwise deformed under such loads.

SUMMARY OF THE INVENTION

One embodiment of the invention is directed to a valve actuator comprising a body having at least first and second sides and an interior. A rotatable, threaded drive screw extends into the body and projects out of the body first and second sides. The drive screw comprises an insertion portion and a distal end portion. A traveling nut is threadingly captured on the drive screw in the body interior. The traveling nut is held against rotation whereby it travels along the drive screw as the screw rotates. An actuator arm engages the nut and is configured to be urged between valve open and closed positions as the traveling nut travels along the drive screw. A first collar is attached to at least a portion of the drive screw insertion portion and has at least a bearing for rotatably engaging the body. A second collar is attached to at least a portion of the drive screw distal end portion and has at least a bearing for rotatably engaging the body.

Other details of this and other embodiments of the present invention are illustrated in the drawings and described below.

DETAILED DESCRIPTION

Figure 1:
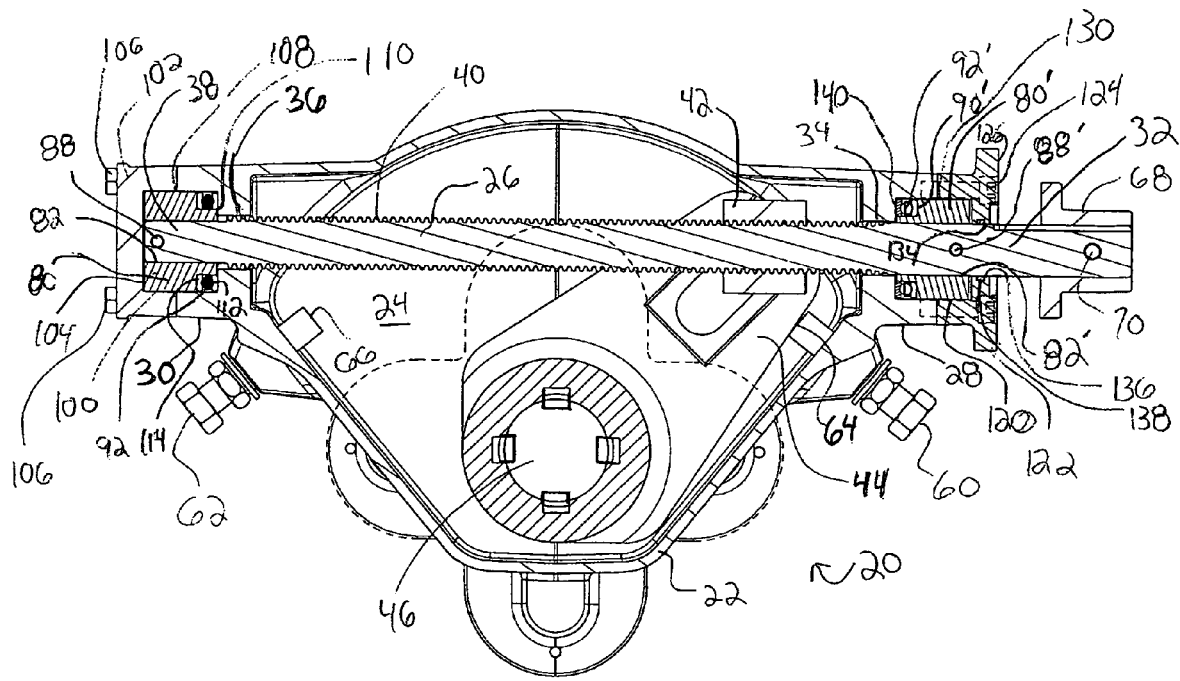
FIG. 1 is a top cross-sectional view of a valve actuator embodying the principles of one embodiment of the present invention.

One example embodiment of the present invention is directed to a valve actuator, such as the type used to open and close butterfly valves. An exemplary actuator of the invention 20 is shown in a plan view cross section in FIG. 1, and in an elevational cross section in FIG. 2. The valve actuator 20 includes a body 22 which has a generally hollow interior 24, with various openings therein, as discussed below. Void spaces in the interior 24 may be filled or partially filled with a lubricant such as grease. A rotatable drive screw 26 extends through the body 22, into the interior 24, and projects out a body first side 28 and a body second side 30.

A drive screw insertion portion 32 extends through a substantially circular first opening 34 in the body first side 28. A substantially circular second opening 36 in the body second side 30 is provided through which a distal end portion 38 of the drive screw 26 extends. The drive screw 26 has external threading covering at least a segment of a screw central portion 40 extending between the distal end portion 38 and the insertion portion 32. Although not shown in FIGS. 1-2, the threading may extend over all or some of the insertion portion 32 and the distal end portion 38.

Figure 4:
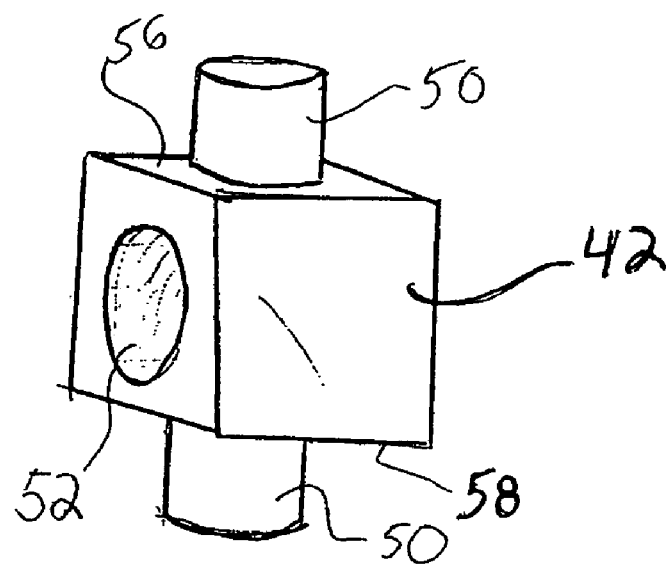
FIG. 4 is a perspective view of the traveling nut of the valve actuator of FIG. 1.
Figure 3:
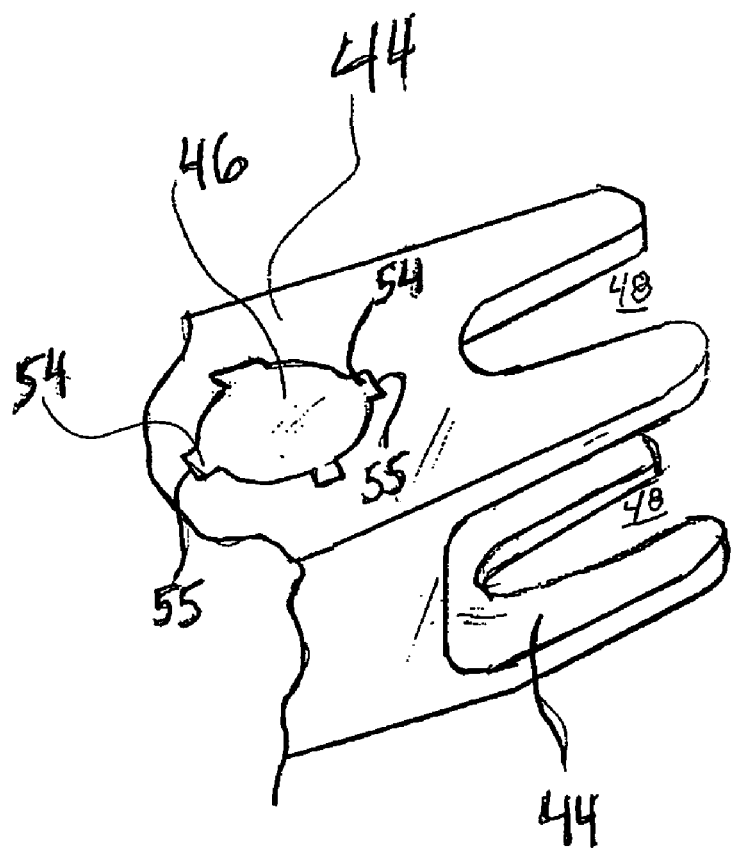
FIG. 3 is a perspective view of a portion of the valve actuator of FIG. 1.

An internally threaded member 42, sometimes referred to as a crosshead or a traveling nut, is captured on the drive screw 26 in the body interior 24. The traveling nut 42 is engaged by a pair of pivotally mounted actuator arms 44, which are connected to a valve pivot shaft 46. FIG. 3 shows a portion of the actuator arms 44 in greater detail. Two arms 44 are arranged vertically with one another. Each arm 44 defines a central slot 48. As shown by FIG. 4, the traveling nut 42 includes a pair of posts 50, one extending upward one extending downward. The nut 42 further includes a central threaded bore 52 for receiving the threaded central portion 40 of the drive screw (FIG. 1).

Referring now to FIGS. 1-4, the central slot 48 in each of the actuator arms 44 receives one of the posts 50. When the posts 50 are so received, the uppermost actuator arm 44 engages or lies adjacent to a nut top surface 56 and the lower actuator arm 44 engages or lies adjacent to a nut bottom surface 58. This placement of the actuator arms 44 prevents rotation of the nut 42 as the drive screw 26 rotates. The engagement of the nut's threaded bore 52 and the drive screw threaded portion 40 thereby causes the traveling nut to move along the drive screw 26. The direction of travel of the nut 42 depends on the direction of rotation of the drive screw 26.

As the traveling nut 42 moves along the drive screw 26, engagement of the posts 50 cause the actuator arms 44 to pivot about the shaft 46. The actuator arms 44 are lockingly engaged with the shaft 46 by engaging axial shaft ridges 54 in cooperating slots 55. As the arms 44 pivotably move, the shaft 46 therefore is axially rotated. The shaft 46 is connected to a valve flap (not shown) in a valve housing (not shown), which may be located below the body 22. Rotation of the drive screw 26 thereby can cause the valve shaft 46 to pivotably move between positions in which the valve flap may be open, closed, or some other desired position.

It will be appreciated that the configuration of the traveling nut 42 and arms 44 shown in FIGS. 1-4 are one example only. Many other particular configurations are possible. Another example is a link lever configuration, which is generally known and therefore will not be described in detail herein for sake of brevity. Other exemplary configurations include, but are not limited to, a single actuator arm 44 (e.g., only an upper or lower) engaging a traveling nut 42 that has only a single post 50, traveling nuts 42 of different shapes than that shown, actuator arms 44 of different shapes, and the like.

As best illustrated by FIG. 1, travel of the actuator arms 44 is restrained between closed and open positions through use of a first adjustable stop screw 60 adjustably extending through a threaded passage (not shown) in the body first side 28, and a second adjustable stop screw 62 adjustably extending through a threaded passage (not shown) in the body second side 30. FIG. 1 illustrates the actuator arm 44 in a position where it engages an inner end 64 of the first adjustable screw 60 in the valve actuator interior 24. When the arms 44 are urged towards the body second side 30 through movement of the traveling nut 42, a maximum travel distance will be reached when one or both of the arms 44 engages an inner end 66 of the second stop screw 62.

The stop screws 60 and 62 can be adjusted from external of the body 22 by rotating the threaded screws 60 and 62. Such adjustment will vary the distance that the screw ends 64 and 66 extend into the body interior 24. The allowable travel distance of the actuator arms 44 is thereby adjusted, as well as the corresponding allowable travel distance of the traveling nut 42 and the valve flap (not shown). This is a useful benefit that allows, for example, the valve flap closed position to be conveniently tightened from external of the valve actuator body 22 without having to disassemble to the body to access its interior 24.

In addition to the stop screws 60 and 62, other configurations can be utilized to limit travel of the nut 42. For example, stop nuts can be positioned as desired on the drive screw 26 that will stop the traveling nut 42 from further travel when they engage it. Other mechanisms and configurations are likewise suitable and will be apparent to those knowledgeable in the art.

The drive screw 26 may be connected to a drive mechanism (not shown) external to the valve actuator body 22. A locking collar 68 held to the shaft by a pin 70 may be useful to connect the drive screw 26 to the drive mechanism. The drive mechanism may effect rotational movement of the drive screw 26 relative to the body. Suitable drive mechanisms include direct motor drive, a motor drive connected with appropriate gears or belts, or may be a manual drive arrangement with an example being a hand crank. As the drive mechanism rotates the drive screw 26 and the traveling nut 42 moves and causes the actuator arm 44 to pivotably move, a force such as an input torque or turning force may be placed on the drive screw 26. Depending on the size of the valve and other application specific parameters, the force or torque on the drive screw 26 can be significant.

Assume, for example, that the actuator arm 44 is positioned against the second stop screw 62 and thereby restrained against further travel towards the second side 30. If the drive screw 26 continues to rotate and urge the traveling nut 42 towards the second side, the nut 42 can impart a force on the drive screw 26 in an opposite direction—towards the valve actuator first side 28. Depending on the size of the valve actuator 20, the drive mechanism, and other factors, such a force can be significant. By way of example, a force of several tons or more can be developed in some relatively large valve actuators. Some valve actuators of the prior art have had difficulties in withstanding such a force, with some suffering defects and failures that can include bowing or other deformation of their drive shaft.

Embodiments of the present invention with an example being the valve actuator 20, however, have been discovered to offer significant advantages and benefits in withstanding such loads. The structural configuration exemplified by the actuator 20 has been discovered to contribute to these and other benefits. This configuration can result in a substantially tensile load, as opposed to a compressive load, being placed on the drive screw 26 when the nut 42 is urged in a direction towards the first side 28. Such a force might result, for example, when the actuator arm 44 is engaging the stop screw 62 on the body second side 30 and the drive screw 26 is being rotated to urge the traveling nut 42 in the direction of the distal end portion 38. This is achieved in part through provision of thrust bearing means proximate not only the drive screw insertion portion 32, but also proximate the distal end portion 38.

Figure 5:
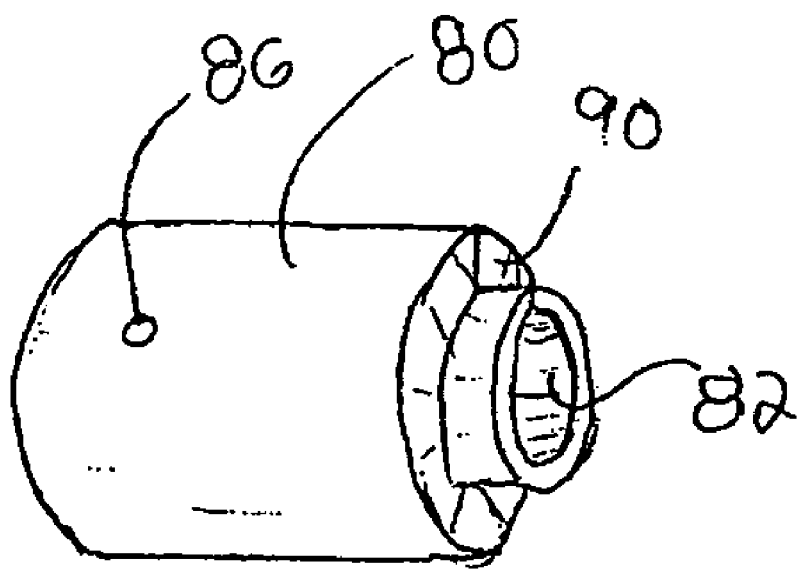
FIG. 5 is a perspective view of the collar of the valve actuator of FIG. 1.
Figure 6:
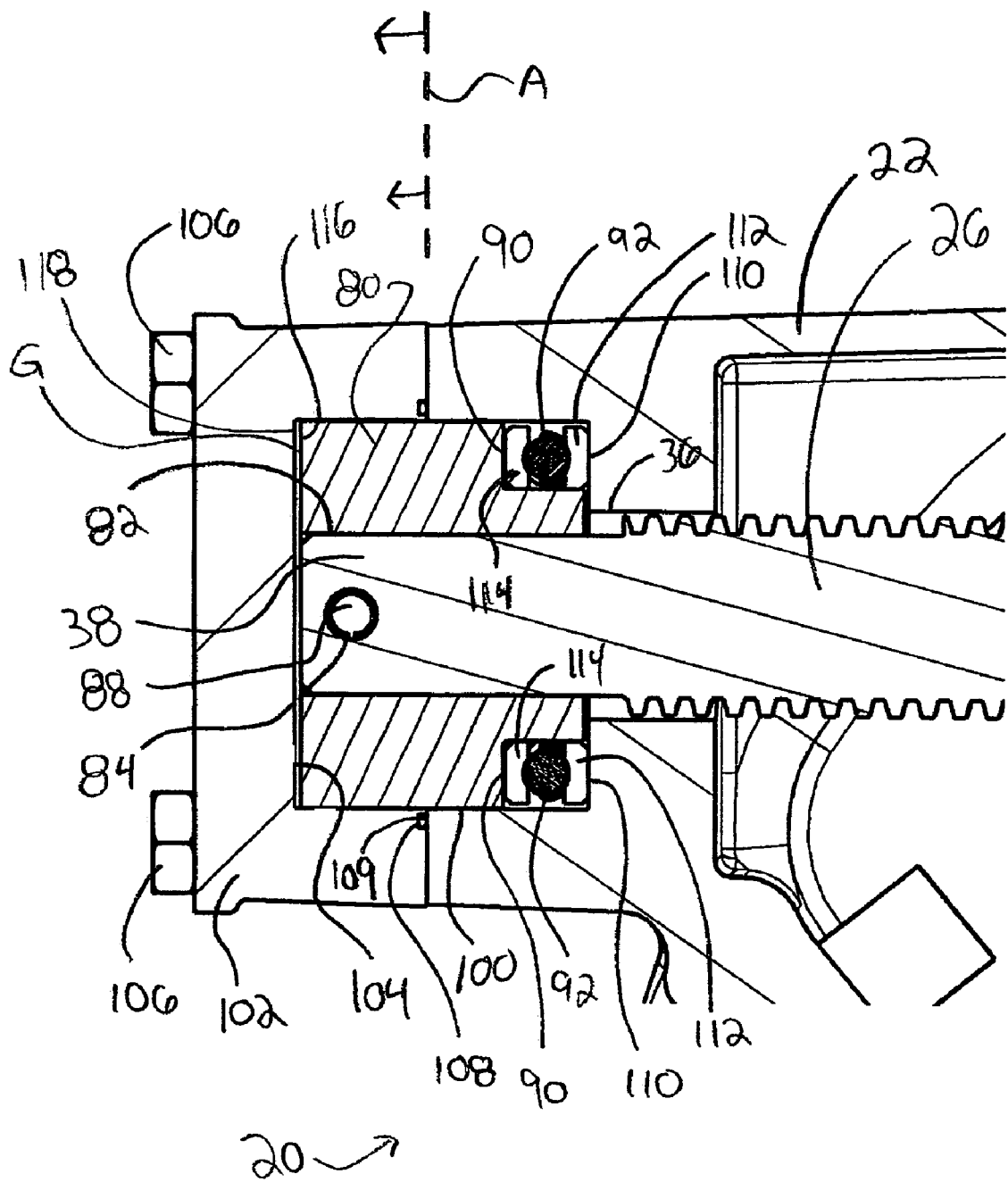
FIG. 6 is an enlarged partial cross-sectional view from FIG. 1 including a distal end collar.

As shown by FIGS. 1-2 and 5-6, the valve actuator 20 includes a distal collar 80 surrounding at least a section of the drive screw distal end portion 38. FIG. 5 illustrates the distal collar 80 in isolation, and FIG. 6 is an enlarged portion of FIG. 1 showing the portion of the valve actuator 20 that includes the distal collar 80. The collar 80 is substantially cylinder shaped, and includes a central bore 82 which has a smooth inner perimeter wall and is configured to receive at least a section of the drive screw distal end 38.

Figure 2:
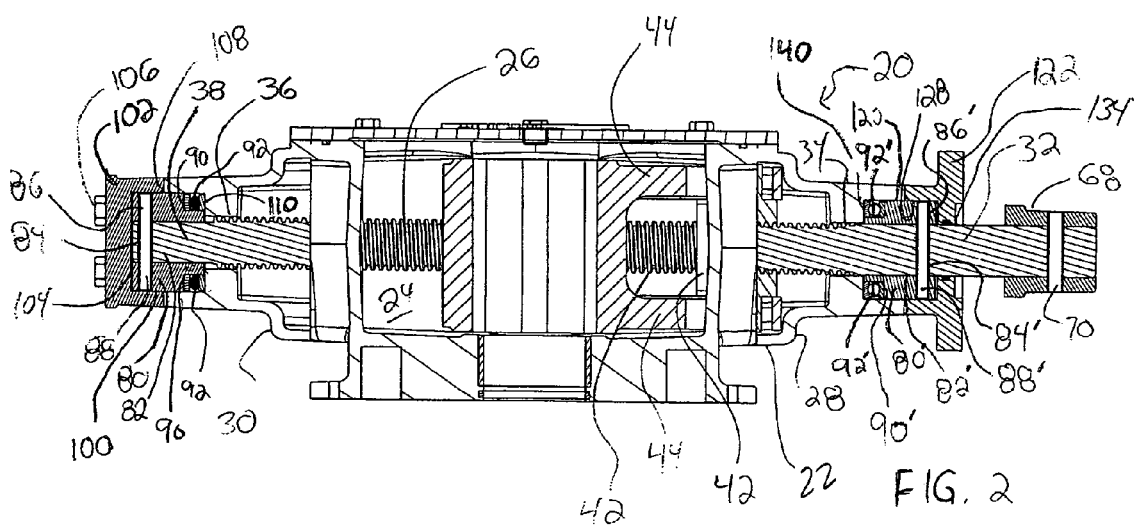
FIG. 2 is a side cross-section view of the valve actuator of FIG. 1.

As best illustrated by FIG. 2, the screw distal end portion 38 includes a radial passage 84 that cooperates with a collar radial passage 86 extending through the first collar 80. When the collar 80 is in place on the screw distal end portion 38, the passages 84 and 86 cooperate to form a continuous passage through which a removable locking pin 88 extends to hold the distal collar 80 in place on the drive screw distal end portion 38 and to thereby restrain relative motion between the drive screw 26 and the distal collar 80. The locking pin 88 is configured to be substantially flush with the perimeter of the distal collar 80. The distal collar 80 further includes a thrust bearing surface in the form of an annular groove or race 90 that extends about the perimeter of an axial end of the collar 80. A plurality of thrust bearings 92 are rotatably held in the race 90.

The distal collar 80 is rotatably held in a substantially cylinder shaped distal holding chamber 100. The chamber 100 is dimensioned to allow for rotation of the distal collar 80 therein. The holding chamber 100 is partially defined by a removable distal end cover 102 which includes a substantially cup-shaped interior side 104 that forms a portion of the chamber 100. The end cover 102 is attached to the body 22 using a plurality of threaded bolts 106 that are threadably received by the body 22. Several other fastening arrangements can be provided, with examples including but not limited to a friction or snap fit, or other well known attachment mechanisms.

Figure 6A:
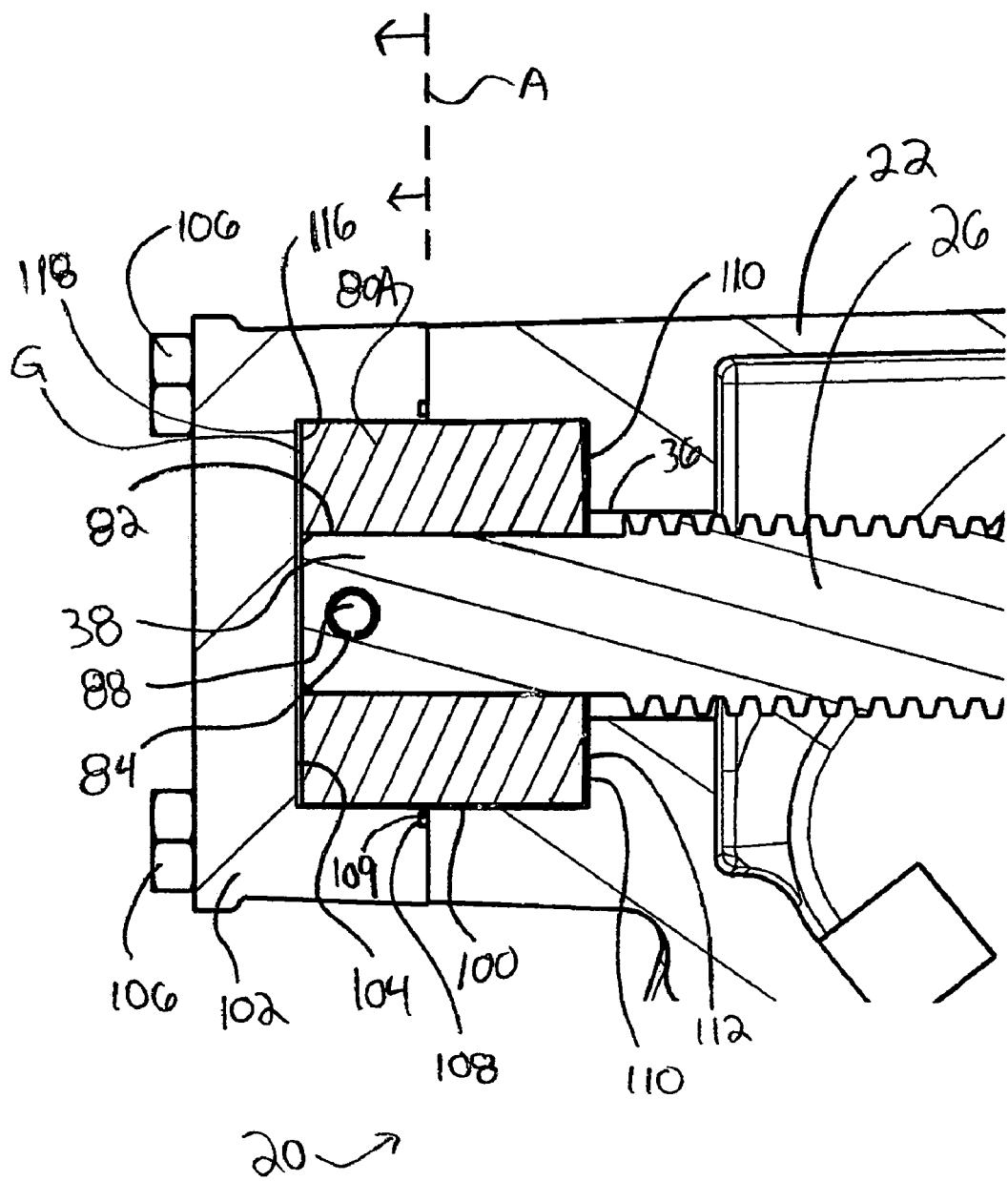
FIG. 6A is an enlarged partial cross-sectional view from FIG. 1 including an alternative embodiment of the end collar of FIG. 6.

The distal end cover 102 surrounds and encloses at least a portion of the drive screw distal end portion 38 and of the distal collar 80. The distal end cover 102 will prevent dirt and other debris from entering the valve actuator interior 24, will provide a safety shield with respect to the rotating drive screw 26 and collar 80 and will provide other benefits. As best shown by FIGS. 6 and 6A, the distal end cover 102 includes an annular groove 108 adjacent to the actuator body 22 for holding an o-ring 109 to provide a fluid-tight sealing engagement with the body 22 and the distal holding chamber 100. Lubricant fluid can thereby be contained within the chamber 100. The distal holding chamber 100 further includes an inner axial end wall 110 defined by the body 22. The circular passage 36 extends through the end wall 110. As illustrated, the distal collar 80 has a diameter larger than the circular passage 36 so that it may be held in the chamber 100.

As best illustrated by FIG. 6, the end wall 110 defines a thrust bearing surface for engaging thrust bearings 92 held in the distal collar race 90 for rotating engagement between the collar 80 and the chamber end wall 110. The race 90 may be further defined by first and second race washers 112 and 114 which have a generally cupped face for cooperating with the spherical thrust bearings 92. The bearings 92 travel and rotate between race washers 112 and 114 to reduce the frictional forces acting on the ball bearings 92 and thereby improve rotation and extend their service life. Race washers 112 and 114 may also function as spacers to adjust the engagement position of the collar 80 and the end wall 110—a thicker washer 112 may be used to separate the collar 80 from the end wall 110 by a greater distance. It will be appreciated that a wide variety of bearing means will be suitable in practice of the invention in addition to the ball bearings 92. Other examples include roller bearings, cooperating low friction surfaces such as those made of a polymer such as TEFLON® (DuPont Corp., Delaware), and the like. The ball bearings 92, roller bearings or other bearing means may also be captured by a bearing cage.

In the embodiment shown in FIG. 6A, the distal collar 80A also acts as the thrust bearing, without the need for a separate bearing, such as a ball bearing, roller bearing, or other additional bearing mechanism. Such an arrangement as shown in FIG. 6A is suitable for smaller sized valves which do not require as great a force to open or close as larger valves. In this embodiment, the material of the distal collar 80A may facilitate its use as a bearing, such as the distal collar being fabricated from brass.

In the exemplary actuator 20, a small gap G is defined between collar axial end 116 and the chamber distal end wall 118. Among other benefits, this gap is useful to ensure that the collar 80 (and the drive screw 26, which does not extend beyond the collar axial end 116) does not frictionally engage the end wall 118 during rotation, to ensure that axial forces in the direction of the distal end cap 102 will be born by thrust bearing means proximate to the drive screw insertion portion 32 (by thrust bearings 92' as is discussed herein below). The distal collar 80 together with its thrust bearings 92 in rotating engagement with the second chamber end wall 110 (neglecting for the moment the race washer 112) are useful to bear thrust forces acting on the drive screw 26, including a load urging the drive screw 26 in the direction away from the body second side 30 and towards the first side 28. This has been discovered to offer significant benefit and advantage. Some valve actuators of the prior art that did not include a configuration such as that of the exemplary valve actuator 20 risked deformation of the drive screw 26 under some loads. For example, if a valve actuator included only a thrust bearing near the drive screw insertion portion, a load imparted onto the drive screw in the direction of the insertion portion would act on the drive screw in a compressive manner. If the load was large enough and was imparted from a position some distance from where the thrust bearings were located (i.e., the valve actuator first side), such a compressive force could result in a deformation, such as a bowing of the drive screw.

The distal collar 80 and thrust bearings 92 of the exemplary valve actuator 20, however, have been discovered to significantly improve performance under such circumstances. The schematic diagram of FIG. 7 can be useful to illustrate this benefit. When the traveling nut 42 is in the position shown in FIG. 7 engaging the second side stop screw 62, rotation of the drive screw in a direction that would urge the traveling nut towards the distal collar 82 will cause the nut 42 to urge the threaded drive screw in the opposite direction (i.e., away from the collar 80).

Figure 7:
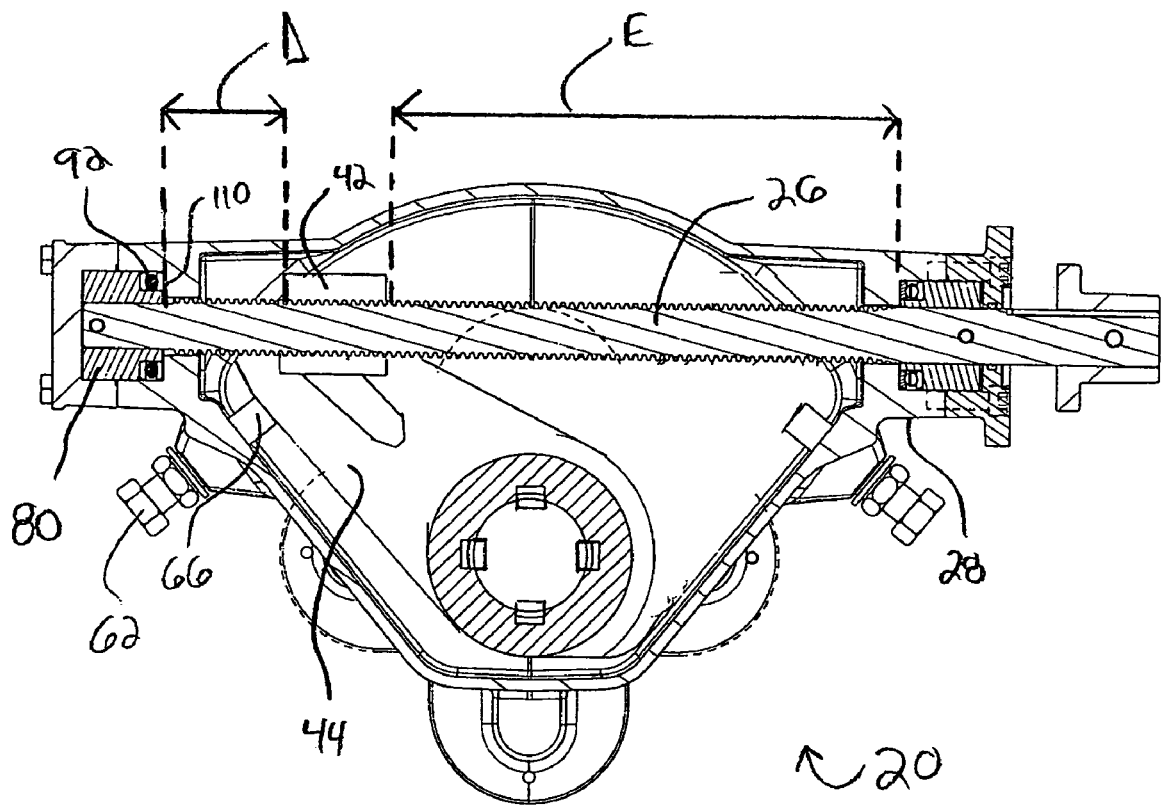
FIG. 7 is a schematic useful to illustrate some aspects of the present invention; and, FIG. 8 is an expanded portion of FIG. 1 including an insertion end collar.

The configuration of the actuator 20, including the distal collar 80, distal chamber end wall 110, bearings 92, and other elements, results in at least a portion of the resultant load to be distributed as a tensile load in the direction of the nut 42 from the collar 80 over the portion of the screw identified as D in FIG. 7 (i.e., a "pulling" force towards the nut from the collar 80). If no collar 80, bearings 92 or end wall 110 were provided, this load could have resulted in a compressive load in the direction of the actuator first side 28 from the nut across the portion of the screw identified as E in FIG. 7 (i.e., a "pushing force from the nut towards first side 28).

Those knowledgeable in the art will appreciate that distributing this force as a tensile load over screw portion D is desirable as compared to distributing it as a compressive load over screw portion E, since a compressive load would risk bowing deformation of the screw portion E. Bowing of the screw 26 could lead to actuator operation problems or even failure. A tensile load carried over the shorter portion D, on the other hand, is less likely to result in screw deformation. Further, deformation under tensile strain (however unlikely) would be expected to be a lengthening (e.g., "stretching") of the portion D, which would likely have a less significant effect on the operation of the actuator 20 than would bowing of the drive screw 26.

The distal end cover 102 and the cooperating passages 84 and 86 are configured so that the locking pin 88 is accessible from external to the valve actuator 20 when the end cover 102 is removed from the body 22. This is best illustrated by FIG. 6, from which it can be appreciated that when the second end cover 102 is removed from the body 22 the section of the screw distal end portion 38 in the direction of the arrows of the dashed line A is accessible. This is useful to allow the distal collar 80 to be installed on the drive screw distal end portion 38 after the drive screw 26 has been installed in the valve actuator 20.

Figure 8:
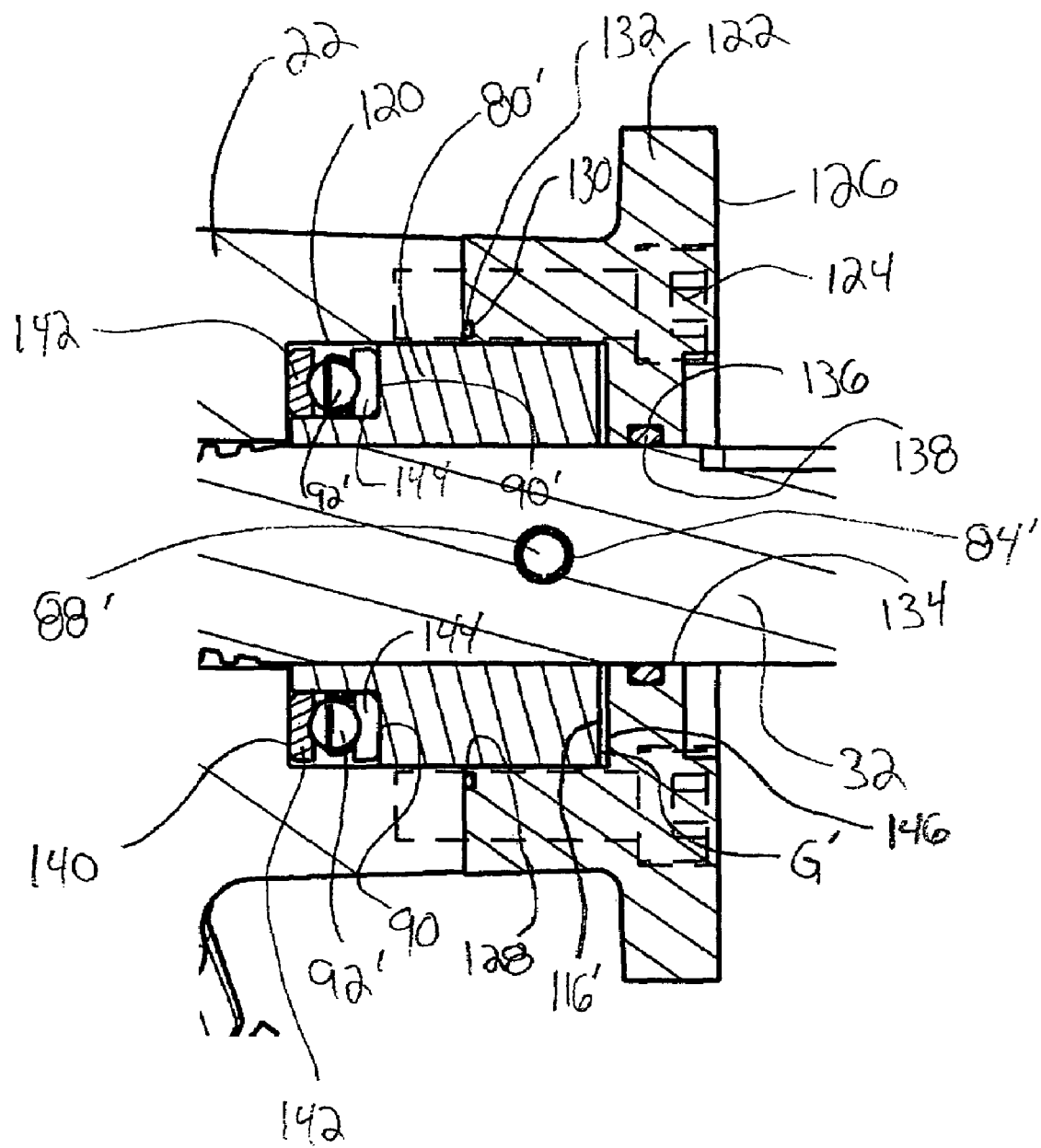

A best illustrated by FIG. 8, the valve actuator 20 further includes an insertion collar 80' surrounding a portion of the drive screw insertion portion 32. In the exemplary valve actuator 20, the insertion collar 80' is substantially identical to the distal collar 80, except that it is retained on the insertion portion 32 of the drive screw 26. For convenience and sake of brevity, elements of the insertion collar 80' that are consistent with those of the distal collar 80 have been identified in FIGS. 1-2 and FIG. 8 (which is an expanded view of the portion of FIG. 1 that includes the insertion collar 80') using like element numbers together with a single apostrophe (i.e., "prime" designation). Description above of like elements, their function and operation can be considered to likewise apply to corresponding elements of the insertion collar 80'. Further, it will be appreciated that the distal collar 80 shown in FIG. 5 likewise represents the insertion collar 80'.

The insertion collar 80' is contained in an insertion holding chamber 120. The chamber 120 is substantially cylindrical shaped, and dimensioned to rotatably hold the insertion collar 80'. Lubricant such as oil, grease or the like may be placed in the chamber 120 to facilitate low friction rotation of the collar 80' therein. The chamber 120 is partially defined by an insertion end cover 122 which is removably attached to the body 22 using threaded bolts 124 (shown in dashed in FIGS. 1 and 8) that extend through a portion of the insertion end cover 122 and into threaded engagement with the body 22. As shown by FIG. 1, the bolts 124 are substantially flush with the outer face 126 of the end cover 122. The insertion end cover 122 has a substantially cup shaped interior side 128 that partially defines the insertion holding chamber 120. In addition to the bolts 124, a number of other suitable fastening arrangements can be provided for attaching the insertion end cover 122 to the body 22, including a friction or snap on fit, or other well known attachment mechanisms.

An annular groove 130 is provided in the end cover 102 for holding an o-ring 132 to aid in fluid-tight sealing engagement with the body 22 and the insertion holding chamber 120. The first end cover 102 further includes a passage 134 for rotatably passing the screw insertion portion 32. The passage 134 can have the same diameter as the collar passage 82'. A second radial groove 136 is provided on the perimeter wall that defines passage 134 for holding a second o-ring 138 to provide fluid-tight sealing engagement with the drive screw insertion portion 32. Like the distal end cover 102, the insertion end cover 122 is configured such that when it is removed from the body 22, the locking pin 88' is accessible. This is useful to allow for removal or attachment of the collar 80' to the drive screw 26 from external of the valve actuator 20 while the screw 26 is inserted therein.

The insertion holding chamber 120 further includes a thrust bearing surface such as an inner axial end wall 140 for engaging thrust bearings 92' against a cooperating thrust bearing surface such as insertion collar race 90' for rotating engagement between the collar 80' and the chamber end wall 140. First and second race washers 142 and 144 may be provided with the bearings 92' rotating therebetween. Race washers 142 and 144 have a cupped surface for engaging the bearings 92', and can reduce the frictional forces acting on the bearings 92' and thereby improve rotation and extend their service life. Race washers 142 and 144 may also serve as spacers.

The engagement between the bearings 92' and the chamber end wall 140 (neglecting for the moment the race washer 142) is useful to reduce the force required to rotate the drive screw 26 when thrust forces are acting on it (such as, for instance, a load urging the drive screw 26 in the direction away from the body first side 28 and towards the body second side 30.

A small gap G' is defined between insertion collar axial end 116' and the chamber distal end wall 146. This gap is useful to ensure that the collar 80' does not frictionally engage the insertion chamber end wall 146 during rotation. This gap G' is also useful to ensure that a load on the screw 26 and directed along the drive screw 26 in the direction of the actuator first side 28 is born by the distal collar bearings 92. Referring to FIG. 7 in addition to FIG. 8 by way of further illustration, engagement between the insertion collar axial end 116' and the insertion chamber end wall 146 would risk converting some or all of a tensile load over portion D of the screw 26 to a compressive load over portion E. In this manner, the gap G' (together with the gap G at screw distal end 38) promotes a constant tensioning of the drive screw 26 between its distal end 38 and insertion portion 32 and therefore reduces risk of bending or buckling.

The present invention thereby presents valuable benefits and advantages. It should be understood that description made herein of exemplary embodiments of the invention have been made to describe best known modes for practicing the invention only, but should not be interpreted to limit in any way the scope of the invention which are instead defined by the claims herein below. Various changes and modifications to the above described exemplary embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A valve actuator comprising:
a body having at least first and second sides and an interior;
a rotatable, threaded drive screw extending into said body and projecting out of said body first side and out of said body second side, said drive screw having at least an insertion portion and a distal end portion;
a traveling nut threadingly captured on said drive screw in said body interior, said traveling nut held against rotation whereby said traveling nut travels along said drive screw as said drive screw rotates;
an actuator arm engaging said nut and configured to be urged between valve open and closed positions as said nut travels along said drive screw;
a first collar attached to at least a portion of said drive screw insertion portion, said first collar having at least a bearing for rotatably engaging said body; and,
a second collar attached to at least a portion of said drive screw distal end portion, said second collar having at least a bearing for rotatably engaging said body.

2. The valve actuator as defined by claim 1 wherein said second collar is proximate to said body second side and wherein a tensile load is placed on said drive screw between said traveling nut and said second collar when said traveling nut is urging said screw in a direction away from said second collar.

3. The valve actuator according to claim 1 and further comprising a first adjustable stop screw protruding through said body first side and a second adjustable stop screw protruding through said body second side, said first and second adjustable stop screws configured to limit travel of said actuator arm and limit travel of said traveling nut along said drive screw.

4. The valve actuator as defined by claim 3 wherein said second collar is configured to result in a tensile load being placed on said drive screw when said actuator arm is engaged with said second stop screw and said drive screw is being rotated to urge said traveling nut in the direction of said drive screw distal end portion.

5. The valve actuator as defined by claim 1 and further comprising:
  a locking pin passing through cooperating passages through said screw distal end portion and said second collar, said locking pin holding said second collar to said screw distal end and restraining said second collar from rotation relative to said screw;
  a removable end cover on said body second side and at least partially covering said screw distal end, said removable locking pin accessible when said end cover is removed from said body.

6. The valve actuator according to claim 1 wherein said valve actuator further comprises:
  a substantially cylindrical first holding chamber for rotatably holding said first collar, said first collar at least a bearing engageable between an axial end of said first collar and an end wall of said first holding chamber; and,
  a substantially cylindrical second holding chamber for rotatably holding said second collar, said second collar at least a bearing engageable between an axial end of said second collar and an end wall of said second holding chamber.

7. The valve actuator according to claim 6 wherein said first holding chamber is partially defined by said housing and partially defined by a removable first end cover, and wherein said second holding chamber is partially defined by said housing and partially defined by a removable second end cover.

8. The valve actuator according to claim 7 wherein said second collar is attached to said drive screw distal end using at least one removable pin passing through cooperating passages in said drive screw distal end portion and said second collar, at least a portion of said drive screw distal end and said cooperating distal end portion and second collar passages located outside of said body interior when said second end cover is removed, whereby said pin is accessible from outside of said body interior.

9. The valve actuator according to claim 7 wherein each of said first and second end covers have a cup shaped side that partially defines said first and second holding chambers when said removable first and second end covers are connected to said body, said first and second end covers each having at least one passage for accepting a removable fastener for connecting said end covers to said body.

10. The valve actuator according to claim 7 wherein each of said first and second end covers include an annular groove holding an o-ring for sealing engagement with said body.

11. The valve actuator according to claim 7 wherein said first end cover includes a drive screw passage defined by a passage sidewall, said passage sidewall having a groove holding an o-ring, said drive screw insertion portion rotatably extending through said screw passage and sealingly engaging said o-ring.

12. The valve actuator according to claim 6 wherein said drive shaft distal end portion is at least partially contained within said second holding chamber, and wherein each of said first and second holding chamber end walls are defined by said body.

13. The valve actuator according to claim 1 wherein each of said first and second collars are attached to said drive screw by a removable pin passing through cooperating passages on said drive screw and each of said first and second collars.

14. The valve actuator according to claim 1 wherein said at least a bearing comprises a bearing element separate from said first and second collars and each of said first and second collars has a race containing said at least a bearing.

15. The valve actuator according to claim 14 wherein each of said first and second collars are substantially cylindrical and have axial end walls, said race extending about the perimeter of one of said axial end walls on each of said first and second collars.

16. The valve actuator according to claim 1 wherein:
  said first collar is rotatably held in a first chamber, said first chamber partially defined by at least one end wall;
  wherein said first collar at least a bearing is carried along a collar first distal end; and,
  wherein said first collar includes a second distal end, a gap defined between said second distal end and said chamber end wall.

17. The valve actuator according to claim 1 wherein said actuator arm is pivotally connected to a pivoting valve shaft operable to pivotably rotate between an open and a closed position.

18. A valve actuator comprising:
  a body having first and second sides, an interior and an exterior;
  an insertion holding chamber partially defined by said body and by an insertion end cover removably attached to said body, said insertion holding chamber having an axial end wall, said insertion end cover having an inner cup-shaped side;
  a distal holding chamber partially defined by said body and by a distal end cover removably attached to said body, said distal holding chamber having an axial end wall, said distal end cover having an inner cup-shaped side;
  a drive screw passing through said body interior and extending out of said first and second sides, said drive screw having a distal end portion, an insertion portion, and a threaded portion extending at least partially between said distal end portion and said insertion portion, said distal end portion at least partially contained in said distal holding chamber;
  a traveling nut on said drive screw threaded portion;
  an actuator arm engaging said traveling nut and holding said nut against rotation whereby said traveling nut moves along said threaded portion as said drive screw rotates, said actuator arm connected to a pivoting valve stem and movable between a valve open and closed position by said traveling nut as said traveling nut moves along said drive screw threaded portion;
  a first adjustable stop screw extending through said body first sidewall and a second adjustable stop screw extending through said body second sidewall, said first and second adjustable stop screws engageable against said actuator arm to thereby limit travel of said actuator arm;
  a cylindrical insertion collar removably attached to said drive screw insertion portion by at least one pin, said insertion collar rotatably contained in said insertion holding chamber, said at least one pin accessible from said body exterior when said insertion end cover is removed from said body, said insertion collar comprising a bearing engaging said insertion chamber axial end wall;

a cylindrical distal collar removably attached to said drive screw distal end portion by at least one pin, said distal collar rotatably contained in said distal holding chamber, said at least one pin accessible from said body exterior when said distal end cover is removed, said distal collar comprising a bearing engaging said distal holding chamber axial end wall; and, whereby a load imparted onto said drive screw from said traveling nut can be at least partially carried as a tensile load between said traveling nut and said distal collar.

19. A valve actuator as defined by claim 18 wherein a passage extends through said distal holding chamber axial end wall, said passage configured for rotatably passing said screw distal end portion, said passage having a diameter smaller than a diameter of said distal collar.

20. A valve actuator comprising:

a body having an exterior and an interior;

a rotatable drive screw extending through said interior of said body, said drive screw having at least an insertion portion and a distal end portion and an externally threaded portion;

a traveling nut threadingly captured on said externally threaded portion of said drive screw in said body interior, said traveling nut held against rotation whereby said traveling nut travels along a length of said drive screw as said drive screw rotates;

at least one pivotally mounted actuator arm engaging said nut and configured to be pivoted between a first and a second position as said nut travels along said length of said drive screw;

a first thrust bearing surface associated with said drive screw insertion portion facing towards said interior, a second thrust bearing surface associated with said body and facing said first bearing surface; and, a third thrust bearing surface associated with said drive screw distal end portion facing towards said interior, a fourth thrust bearing surface associated with said body and facing said third bearing surface.

* * * * *